US010025703B2

(12) United States Patent
Macor

(10) Patent No.: US 10,025,703 B2
(45) Date of Patent: *Jul. 17, 2018

(54) COLLECTABLE DISPLAY DEVICE

(71) Applicant: James J. Macor, Jackson, NJ (US)

(72) Inventor: James J. Macor, Jackson, NJ (US)

(73) Assignee: Goldfinch Design Studio, LLC, Jackson, NJ (US)

( * ) Notice: Subject to any disclaimer, the term of this patent is extended or adjusted under 35 U.S.C. 154(b) by 910 days.

This patent is subject to a terminal disclaimer.

(21) Appl. No.: 13/801,405

(22) Filed: Mar. 13, 2013

(65) Prior Publication Data

US 2013/0246692 A1    Sep. 19, 2013

Related U.S. Application Data

(63) Continuation-in-part of application No. 12/927,565, filed on Nov. 18, 2010.

(51) Int. Cl.
| | |
|---|---|
| *B65D 85/58* | (2006.01) |
| *G06F 12/02* | (2006.01) |
| *G07D 9/00* | (2006.01) |
| *G06Q 30/00* | (2012.01) |

(52) U.S. Cl.
CPC ....... *G06F 12/0246* (2013.01); *G06Q 30/018* (2013.01); *G07D 9/002* (2013.01)

(58) Field of Classification Search
CPC .. B65D 85/58; B65D 2101/00; G06F 12/0246
USPC ..... 206/323, 0.8, 0.81, 0.84; 40/642.08, 661
See application file for complete search history.

(56) References Cited

U.S. PATENT DOCUMENTS

| | | | | |
|---|---|---|---|---|
| 5,191,972 | A | * 3/1993 | Helzer | ..... A47G 1/12 |
| | | | | 206/0.8 |
| 6,250,549 | B1* | 6/2001 | DeFabio, Jr. | ..... 235/380 |
| 6,929,127 | B1* | 8/2005 | Delk, Sr. | ..... B42F 5/00 |
| | | | | 206/0.84 |
| 2002/0008690 | A1* | 1/2002 | Cooper | ..... 345/156 |
| 2006/0261592 | A1* | 11/2006 | O'Keefe | ..... 281/22 |
| 2007/0113451 | A1* | 5/2007 | McDowell et al. | ..... 40/642.02 |
| 2007/0118436 | A1* | 5/2007 | McDowell et al. | ..... 705/26 |
| 2010/0052306 | A1* | 3/2010 | Teicher | ..... 281/45 |

* cited by examiner

*Primary Examiner* — Anthony Stashick
*Assistant Examiner* — Blaine Neway
(74) *Attorney, Agent, or Firm* — Perry M. Fonseca

(57) ABSTRACT

Provided is a collectable display device, including at least one display panel having at least one user accessible opening for housing and displaying at least one collectable object. The display panel is configured to be connected or connectable to at least one auxiliary panel having visual markings relating to at least one collectable. The collectable display device also includes an electronic solid-state flash memory data storage device that is non-detachably secured to the auxiliary panel, and the solid-state flash memory device is having sufficient storage capacity to record and store at least one digital picture image associated with at least one appearance characteristic of at least one collectable object. In operation, the solid-state flash memory device is readable by an electronic device physically and electronically connected to the solid-state flash memory device. In some embodiments, the collectable object is a coin, a stamp, or a sports card, or the like.

12 Claims, 5 Drawing Sheets

COLLECTABLE DISPLAY DEVICE

CROSS REFERENCE TO RELATED APPLICATIONS

This application is a continuation-in-part of and claims priority from U.S. patent application Ser. No. 12/927,565, filed by James J. Macor on Nov. 18, 2010, entitled "Collectible display panel device with data storage component," which is a continuation-in-part of U.S. patent application Ser. No. 11/493,312, filed on Jul. 26, 2006, entitled "Protection authentication, identification device for a collectable object", now U.S. Pat. No. 8,376,133, and incorporated herein by reference in its entirety. This application is also related to the following US patent applications by James J. Macon: U.S. patent application Ser. No. 12/927,565, filed on Nov. 18, 2010, entitled "Collectible display panel device with data storage component"; U.S. patent application Ser. No. 12/156,186, filed on May 30, 2008, entitled "Authentication and identification device for a collectable object"; U.S. patent application Ser. No. 11/710,378, filed on Feb. 23, 2007, entitled "Protection and authentication device for a collectable object"; U.S. patent application Ser. No. 12/928,280, filed on Dec. 8, 2010, entitled "Associative data storage devices for authentication of collectable objects"; and, U.S. patent application Ser. No. 13/758,882, filed on Jan. 25, 2013, entitled "Protection and identification device for collectable objects." These applications are also incorporated herein by reference in their entirety.

FIELD OF THE INVENTION

This invention generally relates to the display and storage of collectable objects, and more particularly to a collectable display device that incorporates an electronic solid-state flash memory data storage device.

BACKGROUND OF THE INVENTION

Collecting coins has been an enjoyable pastime for many generations. To enhance coin collecting, a number of plastic holders, display boards and albums have been developed to assist collectors in displaying and protecting their coins. In some popular examples, Whitman display boards and albums are constructed to allow coins to be inserted into openings of the display panel for a collector to build a set of coins in a related series, and providing for a number of coins to be displayed on one display panel. Collectibles certification companies also provide a service to authenticate and encapsulate rare coins and other collectibles in plastic. The marking area on the plastic holders or display boards is limited and only a small amount of information relating to the collectible is possible. However, coins and other collectibles often have a substantial amount of history, artistry, and lore that is associated with the coin or collectable object. Unfortunately, the plastic holders and display boards have a limited surface area for expansive printed information or picture images and a collector is often times unaware of the interesting history and imagery surrounding the coin and the coin's design.

U.S. Patent Application 20070113451 to McDowell describes a collectible holder that is that is fabricated from three portions—a sleeve portion, an insert portion, and a collectible receivable portion. The collectible receivable portion is insertable into, and removable from, an aperture located in the insert portion. The insert portion is inserted into the sleeve portion and sonically bonded. A Radio Frequency Identification (RFID) to is also provided in the collectible holder to store information associated with the stored collectible. As multiple RFIDs can be read simultaneously, numerous features are provided. In one, a scanner is presented at the unloading dock of a convention. A dealer is provided with a time to go through the scanner. All of the dealer's collectibles are uploaded to a remote database, an online store is autonomously generated for the collectibles, and the inventory published to the internet as part of an online inventory of the entire convention. McDowell relies on his RFID system that requires an RFID reader (scanner), and an online website, for publishing a dealer's inventory list of items for sale at a convention. As such, McDowell's RFID and required scanner are opposed to the principles of operation and the objectives of the present invention. Furthermore, McDowell teaches the use of a battery that is also expressly opposed to the non-volatile condition of the present invention's solid-state flash memory data storage device.

U.S. Patent Application 20040039663 to Kernz describes a method and a system facilitating trade in graded encapsulated commoditized objects such as coins includes a marketplace computer operatively controlled by an online peer-to-peer trade enabling facility and storing data associated with offers to sell and offers to buy the objects being selected from a plurality of graded encapsulated objects provided by at least one third party grading firm. A host computer operatively controlled by a market maker engaged in the trade of the graded encapsulated commoditized objects stores relevant trade data associated with the objects. The Internet can be used to connect the computers and to connect sellers and buyers with the marketplace computer whereby the sellers and the buyers are provided access to the relevant trade data stored in the host computer. Kernz describes an invention that includes a coin image compilation from a queried database. Kernz does not describe, and is structurally incapable of storing digital picture images on the device itself, but rather only teaches storing such data remotely on his marketplace computer. Additionally, Kernz expressly relies on the internet for invention operation, wherein the present invention does not.

U.S. Pat. No. 6,501,390 to Chainer provides methods and apparatus to detect and reliably record the physical history of a product including effects due to one or more of the following: 1) product use 2) handling 3) tampering and 4) environment of the product (as changes in the environment, such as excessive temperatures, humidity, or shocks, can result in degradation to a product). The apparatus includes a "smart card", or, more generally, "smart token", in combination with one or more sensors which record the external influences on the product and/or the environment and records those changes in an encrypted form. This information can then be verified by any individual who is equipped with a (possibly public) decryption key, but capability to modify this information, depending on the application, is restricted to those with access to the encrypting key. Furthermore, the apparatus contains authentication information which can be reliably verified, in particular to confirm that the apparatus is attached to the product it supposed to be attached to. Chainer's complex authentication device is opposed to the simplicity and non-volatile structure of the present invention. Chainer includes an integrated monitor that records changes to physical, chemical and environmental effects on an object, over time, comprising the steps of: sensing data regarding a change in an object using at least one sensor, and sending a RF signal to a storage device embedded within the monitor.

U.S. Pat. No. 5,042,650 to Mayer describes a tamperproof coin case defined by two interlocking plastic plate members ultrasonically bonded together to define a unitary assembly within which a coin and its certificate of authenticity may be permanently secured. One plate member includes a cavity for fully receiving the other plate member therein, with opposing inner surfaces of the plate members being provided with corresponding cylindrical recesses which collectively form a cylindrical cavity within which a pliable plastic retention ring is disposed for securing the coin iii a stationary position and permitting its obverse and reverse sides to be viewed through dome-shaped windows provided on the opposite sides of the case. The case is also provided with outwardly extending circumferential flanges which permit a plurality of cases to be vertically stacked for transport or storage. Mayer merely describes a collectable case and lacking the present invention's use of a nonvolatile solid-state flash memory device.

U.S. Patent Application Publication No. 20330220885 to Lucarelli describes an on-line system for authenticating a collectible item or other type of memorabilia is provided which includes a web page on an on-line title company's website for the collectible item, wherein the web page displays a digital image of the collectible item, written description of the item, and the current owner of the collectible item. The web page is assigned a unique URL address and unique password. The web page may be viewed by the general public via the internet through the URL address in read only format. In the event of a transfer of ownership of the collectible item, the new owner is given the URL address for the web page, and the password. The new owner may then edit the owner information field on the web page by entering the password provided to him or her by the previous owner to update the owner's information displayed on the web page. In a further aspect of the invention, the collectible item is an individual video and audio segment of a celebrity reciting a greeting to an individual chosen from a selection of available greetings, which is saved on a VHS cassette or DVD, and may also be saved in a computer file and then displayed on a web page and viewed by the general public as set forth above. Lucarelli teaches "a system for creating and merchandising celebrity greetings comprising extraneous devices, e.g., a video camera for the continuous recording of a celebrity reciting a plurality of personalized greetings that which is opposed to the objectives and simplicity of the present invention. Unlike the present invention. Lucarelli further relies on an Internet based web page for operation. Lucarelli further fails to disclose the present invention's collectable display panel, auxiliary panel, and inventive use of the nondetachable flash memory data storage device.

U.S. Pat. No. 5,841,878 to Arnold describes a collectible article provides a multimedia representation of a desired subject. Such multimedia representation will include a visual representation of the subject appearing on at least a portion of the article. In addition to such visual media, an audible sound segment, reproducible and selectively activated as desired by an activation switch. The article is advantageously of compact, card-like format, and can be user personalized by permitting the recording, and selective playback, of a sound segment corresponding to the visually depicted image appearing on a portion thereof. The article may optionally include a space reserved for receiving an autograph. By carrying, the article to places where there may be a likelihood of encountering the depicted celebrity, the owner will have same at hand for personalization by the figure. A spoken message to the presenting owner of the card-like article may there be recorded by the celebrity for long-term storage and future playback, and/or the card signed in the appropriate location thereon. The article may further include displayed statistical information and the like disposed on an reverse side of the card, conveniently in the form of for example, a liquid crystal alphanumeric display, or the like, which includes one or more rows. In a further embodiment, the above features are incorporated in a protective housing for display of existing trading cards and the like. Arnold describes the collectable "article as the multimedia representation directly," and therefore lacks a physical collectable object, such as a coin that is also stored in the same device. Furthermore, Arnold teaches an audible sound segment, reproducible and selectively activated as desired by an "activation switch," that requires a battery, and such replaceable battery source as required for operation is expressly opposed to the present invention's nonvolatile device.

U.S. Patent Application No. 20070075861 to Cook describes an RFID tag configured to contain identification information in at least three forms. For instance, the RFID tag may include an RFID system, a human readable number and a bar code that may be visible on an outer surface of the body. The RFID system, the human readable number and the bar code may be adapted to generate the same asset identification number. The RFID tag may also be formed from two or more layers having a thickness sufficient to substantially eliminate interference caused by a shipping container to which the RFID tag is attached. Cook's describes an RFID data storage device for containers that requires a costly RFID reader device and is thereby opposed to the present invention's simplicity, purpose, audience, and use of a non-RFID data storage device.

U.S. Patent Application No. 20030028494 to King describes a system and method for establishing and managing authenticated electronic documents (e.g. commercial contracts) whereby the content, revision status and authenticating parties are stored, tracked, retrieved and validated on demand by permitted users. Variable document data is input by user into an electronic form template and this data is captured by the system. The system derives a document number and revision number for the document and all of this identifying information is associated with the document and stored. A document digest formula is applied to generate a unique document digest. The system then generates a unique barcode for each page of the document based on the digest, document number, revision number and paging details and the barcodes are electronically added to the associated pages of the document. Either the parties to the document sign a printed copy of the barcoded document or a digital signature is applied using a third party validation service. The resultant signed and barcoded document is stored electronically whereby permitted users may locate existing documents (e.g. contracts), track document revisions and validate document contents and signatories. King merely teaches the use of unique barcodes for tracking documents and lacks fundamental structural components of the present invention the display panel, auxiliary panel, a collectable, or the flash memory device of the present invention.

U.S. Pat. No. 6,608,911 to Lofgren relates to digital watermarks integrated into holograms, watermarked hologram structures, and related applications as an authentication technique. One method creates a watermark image, and then embeds the watermark image into a holographic structure. The holographic structure is carried by a smart card. The smart card includes additional information. In one embodiment, the digital watermark includes information bits, and these information bits are used to authenticate the hologram, or the smart card. In another embodiment, the watermark's information bits are compared with the additional information carried by the smart card. The result of the comparison is used to authenticate the smart card or the hologram. Lofgren is concerned with mass produced holographic structures carried by a smart card, such as a credit card for authentication. Among other obvious distinctions, Lofgren lacks the "collectable object" and the "flash memory device" of the present invention.

U.S. Patent Application No. 20050103840 to Boles describes an arrangement for certifying and checking gem stones and other valuables and comprises an electron microscope (11) controlled by a computer (1) and arranged to acquire digitised electron micrographs of characteristic regions of the gem stone or other valuable, particularly the cruet (13) or girdle (14) which are typically highly irregular and therefore highly characteristic of individual stones. The digitised electron micrographs are encrypted and written to an RFID (7) which can be embedded in a plastics certificate (10) of in some cases a concealed on the valuable itself. Any tampering with the gem stone (12) or other valuable can be detected by reading the stored micrographs in the tag (7) and comparing them with micrographs newly acquired from the gem stone (12) or valuable as presented for verification. For extra security, the digitised encrypted micrographs are also stored in a remote database which can also include transaction data and can be linked to a credit card database of a financial institution. Boles teaches adding micrographs to an RFID tag, that furthermore are attached to gemstones.

U.S. Patent Application No. 20090284754 to Haddock describes a method to generate an optical signature of a coin is disclosed. A plurality of parameters are generated and recorded related to rotational positions around the circumference of a coin. The data from these parameters are combined to produce a searchable value. Haddock teaches an elaborate and expensive optical signature system and required equipment, but is not capable, and does not describe storing any digital pictures on the device itself that also stores and displays the collectable.

U.S. Pat. No. 6,250,549 to DeFabio describes a system and method for authenticating a signature on an originally signed article employs at least one camera for capturing an image of an individual when actually signing the article. In one embodiment, the image is a real-time video image, and in another embodiment, the image is a still photo. The images associated with the signed article, so that a holder of the article has a mechanism by which to authenticate the signature. Preferably, the signed article has a unique identifier located thereon, and the image is preferably edited to also include that identifier. A memorabilia kit, containing an originally signed article, a storage medium having stored thereon a captured image of an original signing event associated with the article, is also provided. Additionally, a captured image and data indicative of the signed article are stored electronically in association with each other, such as on a storage medium made available to a holder of the signed article, or in a data base which is accessible remotely. DeFabio teaches a complex system and method, requiring costly superfluous equipment necessary for the "real-time video imaging of a living person" and is expressly opposed to the purpose, structure, and simple operation of the present invention. DeFabio further lacks a nondetachable data storage device, or the flash memory device of the present invention.

U.S. Pat. No. 5,359,571 to Yu describes non-volatile semiconductor memory integrated circuits which partition a main memory array into sub-arrays. Address lines of the main memory array are also partitioned into four groups. The first group and the second group are dedicated for the addressing of the sub-arrays. Each of the sub-arrays can be addressed by a simultaneous energization of a pair of address lines selected from the first and the second group. The third group and the fourth group are used for the addressing for individual memory cells in the sub-arrays. The simultaneous energization of a pair of address lines selected from the third and the fourth group can address any of the memory cells within a selected sub-array. The memory circuits of the present invention are applicable for memory cells with four terminals. In a first embodiment of the invention, the memory circuit is a one-bit wide circuit. In a second and a third embodiment of the invention, the memory circuits are designed as multi-bit-wide circuits whereby data can be programmed parallely. Moreover, in the third embodiment, storage register circuits are implemented, such that during programming, data are cumulatively loaded into the register circuits within a time period, and are simultaneously programmed into the main array within another time period. The programming and the cumulative data loading steps are executed concurrently, resulting in no idle time being wasted. As a consequence, programming can be as fast as reading for memory circuit of the third embodiment of the invention. Yu lacks a collectable object, a collectable display panel, an auxiliary panel, and the solid-state flash memory device of the present invention. Furthermore, Yu's memory arrays are described as being tied to a power source, thereby further opposed to the present nonvolatile invention device purpose and operation.

U.S. Pat. No. 5,743,801 to Welander describes a sports commemorative having an exterior which resembles a sportscard and also having the capacity to store a video highlight sequence. The video highlight sequence features an entity, most commonly an athlete, and is stored as data in a video storage means 12. A decorated housing means 10 surrounds and houses the video storage means 12. The decorated housing means 10 also has, as a part of its structure, an interface means 14. When the interface means 14 is removably connected with a display means, the video highlight sequence may be displayed by the display means. The decorated housing means 10 also supports an identification means 20. The identification means 20 resembles the front of a sportscard and serves to commemorate the featured entity in that fashion. Welander describes a sports commemorative that "resembles" a collectable, a facsimile, but does not actually include a physical collectable object. Welander further describes extraneous and superfluous powered video devices opposed to the present invention's nonvolatile device. Welander further does not teach the flash memory device of the present invention.

U.S. Pat. No. 6,687,209 to Tank describes a collection case combines a trading card with an actual piece of associated memorabilia to enhance its value. The collection case encapsulates the two items together in a protective plastic slab for safe keeping. The process results in a new collectable product of increased value. Tank fails to describe the flash memory device of the present invention or any device capable of storing digital picture images on the device itself.

U.S. Pat. No. 6,839,453 to McWilliam describes a method and system for providing owners, potential buyers and other users of autographed items such as sports and other entertainment memorabilia visual evidence for verifying the authenticity of the autograph are described. A method of the present invention involves capturing an image of the signature as it is being placed on the item. The image so captured is then stored on a computer readable medium. In addition to the item itself, the owner of the item may be provided with a computer readable medium containing computer readable instructions for accessing the image and other information about the item, the signing process, the autographer, etc. The image may be captured by a camera mounted on a pen or other writing instrument. McWilliam discloses a method verifying the authenticity of the autograph that may be captured by a "battery-powered camera mounted on a pen" or other writing instrument. McWilliam fails to disclose the collectable display panel, auxiliary panel, or the flash memory device of the present invention.

U.S. Pat. No. 5,133,451 to Boyd describes an improved container for the storage, display and protection of collectable items such as graded coins, stamps, jewels and other valuables is disclosed. Display of the collectable items is enhanced by an optical element which provides reflective means for viewing the item indirectly. A reflecting prismatic ring is preferred to provide viewing of the periphery of a cavity or the collectable item enclosed therein. In a second embodiment where two or more components may completely enclose the cavity, various tamper-resistant and tamper-evidencing features are further incorporated in the container design to discourage and prevent fraudulent substitutions of collectable items, modification of grade and value certificates enclosed therewith, or counterfeiting of container components. Boyd simply describes a container having a reflective prismatic ring, and lacking any flash memory device.

U.S. Patent Application 20060278539 to Fager describes embodiments of the present invention include a method and apparatus for holding and/or displaying one or more collectible items. The one or more collectible items may include one or more coins. The apparatus may comprise a display card having at least one aperture therethrough and at least one container within the at least one aperture wherein the at least one container is capable of containing the at least one collectible item, and wherein the at least one container is rotatable within the at least one aperture relative to the display card and the at least one collectible item is removable from the display device without damaging or destroying any portion of the display device. Fager describes a display device for holding collectables, and lacking any flash memory device.

There is therefore a need for a collectable display device for collectable objects capable of being configured to store "digital picture images" of the rich history related to a collectable, such as a coin. There is also a need for the device to be inexpensive and yet amplify the collecting and educational enjoyment of a collector by storing both the collectable and the related picture images and other associated information in the same nonvolatile device for long-term storage.

There is also a need for a collectable display device that promotes the collecting and educational enjoyment of a collector that wishes to pursue a "collection" of related collectables, such as a coin series that is collected by date and denomination. The present invention provides a collector the ability to collect a series of coins, one at a time, as the collectable display device of the present invention provides for user accessible openings that store and display each collectable. But furthermore, it allows for adding new collectables or exchanging collectables (collectors often upgrade a coin in better condition) over time, as the collector pursues the gratifying achievement of building a complete set or series of related collectables.

There is also a need for a data storage device that can be read by a standard computer system, without the need for expensive and extraneous equipment, such as RFID transmission, barcode, and required reader devices. In addition, there is a need for a solid-state flash memory data storage device because it is "non-volatile" and being well known in the industry as without the need for an on-board battery or power source. There is also a need for the collectable display device to be storable for many years, and therefore it needs to be storable without the concern of replacing a battery, or the potential adverse effects that may occur, over time, by any adverse chemical reactions that may occur with any attached battery powered device.

There is also a need for the collectable display device that stores digital picture images that can be viewed using a common standard computerized device, without the need of superfluous equipment such as reader devices, video equipment, wireless equipment, or even Internet modems. There is a need that the digital picture image(s) can be viewed using only a common laptop computer with a common USB port, and without the requirement for online Internet operability, or any additional devices.

There is also a need that stored digital picture image(s) and associated data are immutable, such as read-only, at least in part, to resist alteration or accidental deletion thereby being immutable and providing long-term integrity of the original recorded digital picture images and data.

There is also a need for enticing a younger generation that has grown up with electronics and computers as a part of their everyday lives, back to the joys of collecting coins, stamps, and baseball cards, etc.

SUMMARY OF THE INVENTION

In one aspect the present invention presents a collectable display device including a display panel with visual markings relating to at least one collectable object and a user assessable opening configured to store the collectable object. The collectable display device also includes an electronic solid-state flash memory data storage device that is non-detachably secured to the display panel, the solid-state flash memory device configured and having sufficient storage capacity to record and store at least one digital picture image associated with at least one appearance characteristic of at least one collectable object. In operation, the solid-state flash memory device is readable by an electronic device physically and electronically connected to the flash memory device.

In another aspect of the invention, one or more digital picture images may be stored on the flash memory device as read-only, and may further comprise additional data that may also be read-only that corresponds to at least one digital picture image. In some embodiments of the present invention, the flash memory data storage device further comprises a universal serial bus (USB) connector, and the flash memory data storage device may be movable, such that movement provides for concealment in one position and electronic attachment accessibility in a second position.

Another aspect of the invention provides a collectable display device with at least one display panel having at least one user accessible opening for housing and displaying at least one collectable object, and is further connected, or configured to be connectable, to at least one auxiliary panel having visual markings relating to at least one collectable. The flash memory data storage device may further comprise thereon at least one electronic link that can fetch at least one predetermined external database that maintains data associated with at least one collectable. One or more electronic links may be programmed as read-only.

In some embodiments of the present invention, a collectable display device, the auxiliary panel may form a front cover, a rear cover, or both that and is connected to at least one display panel. In other embodiments, the auxiliary panel may form a front cover, a rear cover, or both that is connectable and further detachable to at least one display panel. In some embodiments of the present invention for a collectable display device, the collectable object may be a coin or a sports card.

DETAILED DESCRIPTION

Figure 1:
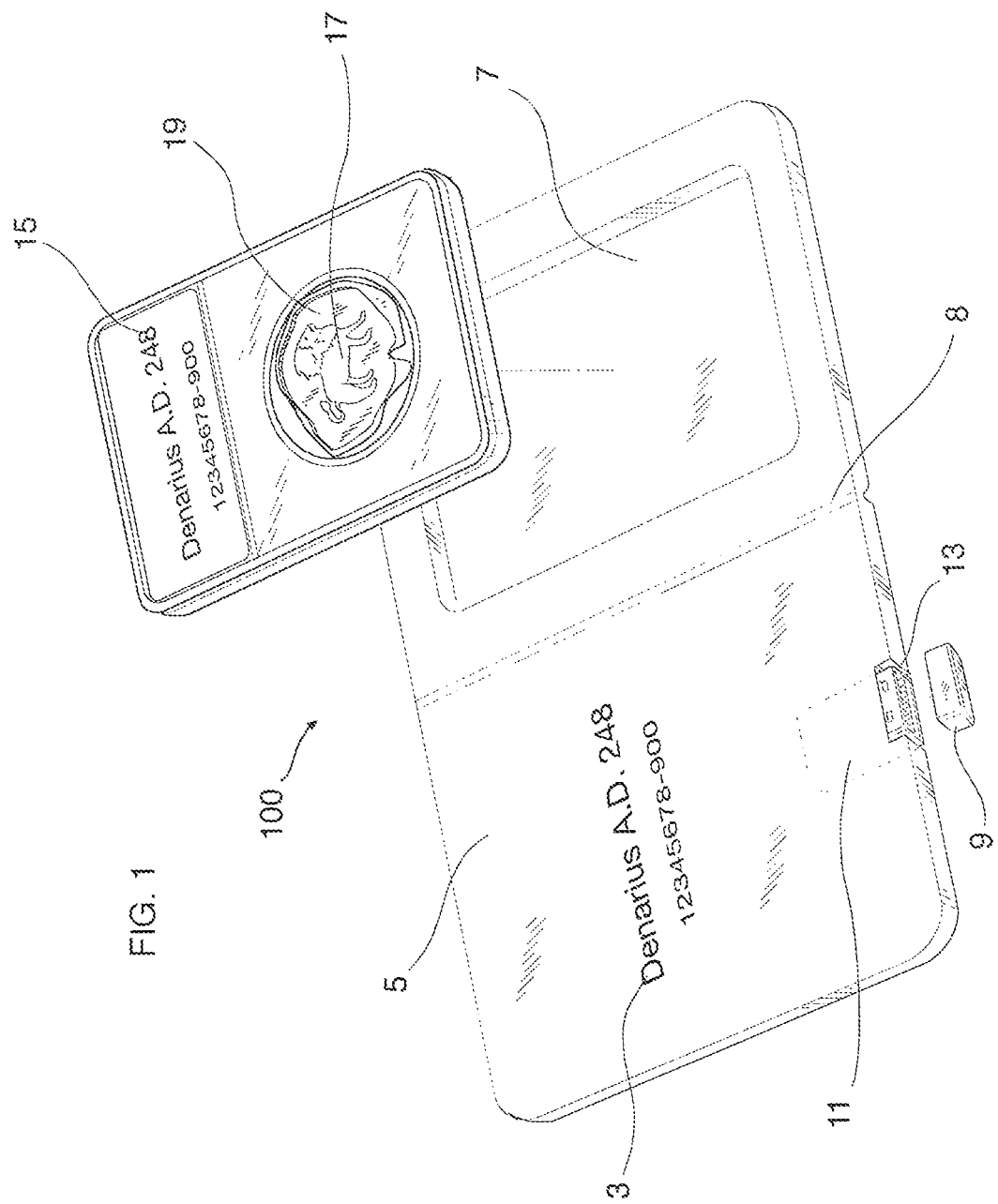
FIG. 1 shows a right front perspective view of an exemplary device for understanding the present invention.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The present invention provides a collectable display device, capable of and configurable to store "digital picture images" of the rich history related to a collectable, such as a coin. The digital picture images may include high-resolution picture images of historical objects, such as buildings, landmarks, art, culture, and/or persons related to the history of the collectable. For instance, a collectable coin may include digital picture images related to the object itself, the design elements, the artistic development, the designer or engraver, the commemoration of persons or events related to the coin, the minting process, or other interesting related "picture imagery." In addition to coins, other collectables such as, stamps, sports cards, currency, and historical memorabilia, are additional collectable examples that would benefit from the present invention.

The present invention also provides for an inexpensive device that amplifies the collecting and educational enjoyment of a collector by storing both the collectable, or a series of collectables, and the related picture images and other associated information in the same nonvolatile display device for long-term storage.

Also provided is a data storage device that can be read by a standard computer system while eliminating the need for expensive and extraneous equipment such as REID transmission, barcode, and required reader devices. One intended audience of the present invention is a common collector, young and old alike, and even a child or novice on a budget. As such, the cost and complexity of the present invention eliminates the need for any extraneous equipment or devices, while maintaining its intended use and simplistic structure as an inexpensive and easy to use device providing for interesting information and digital picture images associated with the collectable, or a related series of collectables.

The present invention also provides that the data storage component is a solid-state flash memory data storage device because it is "non-volatile" and is well known in the industry as not requiring an on-board battery or power source. As the protection and identification device may be stored for many years, it is important that the device of the present invention may be stored without concern of replacing a battery, or the potential adverse effects that may occur, over time, by any adverse chemical reactions that may occur with any attached battery powered device.

The present invention also provides that the digital picture image(s) and associated data may be read-only, in whole or in part, and as such are immutable to intended alteration or accidental deletion thereby providing long-term integrity of the original recorded digital picture images and data.

The present invention also provides one or more display panels comprising one or more user accessible openings for the "customized" housing and displaying of an entire series of collectable objects. The present invention also provides a needed benefit that allows a user to add or upgrade collectables as they are located over time, as a user adds, often one at a time, a the collectable object that is part of a set or related series. The inventive auxiliary panel provides another benefit by being connectable to the exact number of display panels required to display a specific set or collection series.

The present invention also provides that digital picture image(s) stored on the solid-state flash memory data storage device can be viewed by a standard computerized device, such as a common laptop computer with a common USB port, and without the requirement for online Internet operability. In addition to increased cost for Internet service, at times, depending on equipment, service, and location, Internet online operability may not be available or reliable. Remote storage of digital data or images, are potentially susceptible to all kinds of adverse conditions, malfunctions, and failures that are not "controllable" by the owner of the actual collectable display device.

The present invention also advantageously provides an attractive option for a younger generation of collectors, who have grown up with electronics and computers, as a part of their everyday lives. The present invention may help attract young people back to the joys of collecting coins, stamps, and baseball cards, etc. The present inventor is a collector, and understands the connection of studying collectables as they relate to history. This is an important attribute and a significant reason why collectables are sought and enjoyed by old and young alike. Collectables are an opportunity to hold "past" history in one's hands. Therefore, the present invention may help to advantageously "bring to life" the history, people, and lore of a collectable in associated pictures, and data with the physical collectable "in hand," in an inexpensive, non-volatile, long-term collectable display device.

Referring now to the drawings that are for the purpose of illustrating embodiments of the present invention, and are not for the purpose of limiting the same. FIG. 1 shows a right front perspective view of an exemplary device, a collectable display device 100. A "collectable" is defined as any object regarded as being of value or interest to a collector. Collectables are typically physical objects of human interest and study that are sought by collectors for their value, historical interest, or sometimes just personal interest, without limitation. FIG. 1 shows the collectable object as coin 19. Collectables are sometimes housed in clear plastic holders for protection from adverse environmental effects such as moisture and environmental pollutants. Coin 19, for example, is shown housed in a protective holder. Certification companies that authenticate and grade collectables also encapsulate collectables within plastic holders. Within the scope of the present invention, a collectable may be further housed in some form of a protective holder. Other collectable objects that would benefit from the present invention, for example, may include but not limited to, stamps, sports cards, and historical artifacts.

Collectable objects possess appearance characteristics that are used by collectors for identification, origin, condition, rarity, historical attributes, die-varieties, and valuation purposes, just to cite just some examples. Appearance characteristics for a coin may include, for example and without limitation, shape, color, toning, design elements, date of mintage, mintmarks, luster, abrasions, country of origin, denomination, and die-varieties. For example, collectable object 19 may be a coin such as an ancient Roman coin, and in this exemplary example is shown as a Denarius minted A.D. 248. Appearance characteristic 17, such as the "lion" effigy struck into the metal of the coin is quickly associated with a certain type of double Denarius by collectors of ancient Roman coins of the period. Collectors associate and identify the Denarius A.D. 248, as it celebrated the 1000-year anniversary of the founding of Rome. However, this is just one example of one appearance characteristic relating to collectable 19, and typically, collectable objects have multiple appearance characteristics. As such, the reverse of a coin (not shown), for example would also include appearance characteristics such as visual markings relating to that particular collectable object.

An exemplary collectable display device 100, comprises a display panel 5 having visual markings 3 relating to a collectable object 19, and a user assessable opening 7 configured to store the collectable object 19. In this example, coin 19 is shown housed in a protective holder, and the present invention considers that some collectable objects are certified for authenticity and housed in holders by certification companies. Display panel 5 may be made of a variety of materials, for example, display panel 5 may be clear, translucent, or opaque. Display panel 5 may be made from any material suitable, for example, cardboard, plastic, metal, wood, or fabric, or a combination of those materials. User assessable opening 7 is configured to store collectable object 19 by means of nesting collectable object 19 in a preformed cavity 7 in a friction fit method, or otherwise, for storage and removal. User assessable opening 7 may be any structure, shape, or means that allows a user to store and remove collectable object 19 with little or no difficulty. In another example, user assessable opening 7, might be a sleeve or a pocket, or any method or structure that is configured to store collectable object 19 on display panel 5. FIG. 1 shows one of a preferred embodiment of the present collectable display device configured to compactly store one collectable, and shown as a wallet formed display panel that includes a fold in the center 8, that provides further protection as a cover in a closed position.

Collectable display device 100 includes at least one visual marking related to collectable object 19. For example, visual marking 3 is a related marking that identifies, at least in part, collectable object 19. Visual marking 3 may be any form of a visual marking, text or graphic, or combination thereof that is related in any way with collectable object 19. Visual marking 3 may be for example, but not limited to, a sill screen, a pad print, etching, engraving, a label, embossing, or any means of adding at least one visual marking relating to at least one appearance characteristic of collectable object 19.

The exemplary collectable display device 100 further comprises an electronic solid-state flash memory data storage device 11 that is non-detachably secured to the collectable display device 100. This may be accomplished upon or after assembly with display panel 5 by various means. For example, flash memory device 11 is made non-detachable from display panel 5, for example, by utilizing adhesives, interference barbs, interlocking tabs, heat bonding, ultrasonic bonding or other means or structures. "Non-detachable" simply means it resists disassembly and separation.

Electronic solid-state flash memory data storage device 11 is configured having sufficient storage capacity to record and store at least one digital picture image associated with at least one appearance characteristic of collectable object 19. Flash memory data storage device 11 may comprise more than one digital picture image that is related to collectable object 19. For practical reasons, one or more digital picture images stored on the flash memory device 11 may be stored as read-only. As such, flash memory device 11 may be electronically programmed to have an immutable condition, at least in part, to deter a user, intended or otherwise, from altering or erasing one or more digital picture images and data stored on flash memory device 11. For example, flash memory device 11, may be configured with a Read-Only-Memory (ROM), at least in part (such as an integrated circuit partition of the flash memory device), or may be configured as a Write-Once-Read-Many (WORM) device that is immutable as a whole. Another method for example, might simply include a password that identifies an owner, for example the manufacturer, and only allows alteration of data as permissions limited to the owner for a partition, a part, or all of flash memory device 11.

The present invention utilizes a solid-state flash memory data storage device that is distinguished from the use of an RFID data storage device in both electronic structure, physical structure, and cost, considering a typical RFID reader device can cost a user a hundred dollars or more to read the data of an RFID tag.

First, the present invention eliminates the need for a costly RFID reader that is a requirement for reading any data of the RFID. Furthermore the RFID reader is an extraneous device (extra device) that would undermine the simple low-cost operation of the present invention. As such, in addition to a substantial increase in operation cost, if the RFID reader malfunctions, is broken, lost or stolen, the RFID tag by itself is rendered inoperable.

Secondly, Flash memory is a structurally different electronic device that lacks the structural components of a. "RF configured transmitter and receiver" that is a requirement for all RFID devices. RFID tags require an "antenna" such as an induced antenna coil, and communication between the RFID tag and the RFID reader device is accomplished through the antenna coil. So in addition to the costly requirement of a reader device, the RFID is structurally different as well, because all RFID devices require an "antenna" that is conspicuously absent from a flash memory device.

Display panel 5 comprises visual markings 3—e.g., Denarius A.D. 248, for example—and is related to collectable object 19 by appearance characteristics that identify coin 19 as a Roman Denarius. Digital picture image/s associated with at least one appearance characteristic of the collectable object, may include, for example, picture images of the collectable object for further authentication, digital picture images of Rome, the Roman coliseums, the Roman ruler Phillip the 1$^{st}$, or any historically related digital picture images of any objects, places, or persons. The digital picture images may also be included, or a part of, for example, a slide show, a software program, or as a part of a video. In another example, collectable coin 19 may have been a coin that was auctioned by an auction company that captures imagery of individual lots in an auction, and the digital picture images, and/or videos may include, for example, the actual live auction event including persons, auctioneers, numismatic experts, and like related imagery of the sale of that particular collectable object as a historical and authentication legacy. Flash memory data storage device 11 may further include data that corresponds in some way to one or more recorded digital picture images, such as, but not limited to any additional text and data associated with any digital picture images. For example, storylines, text, charts, graphs, or other graphics that may also be programmed as read-only data, in part or whole, may be incorporated.

Solid-state flash memory device 11 is readable by an electronic device physically and electronically connected to the flash memory device 11. In FIG. 1, flash memory data storage device 11 is shown equipped with a Universal-Serial-Bus type connector (USB) 13. USB connector 13 is connectable to any computerized device with a display screen and accommodating USB port, such as a common USB 2.0 port found on many laptop computers. As there are several different shapes and sizes for USB connectors, the scope of present invention includes any form of USB connector configured on a flash memory data storage device. In some embodiments, flash memory data storage device 11 may further comprise at least one electronic link that can fetch at least one predetermined external database that maintains data associated with collectable object 19. The predetermined database may include, for example, coin supply vendors related to coin 1, or "current up to date" valuations of coin 1, or any related website that includes any data associated with coin 19 in any way. Depending on the configuration, flash memory data storage device 21 may comprise multiple electronic Internet links corresponding in any way with coin 19. One or more electronic, links may be programmed as read-only to protect from accidental deletion. USB dust cover 9, is an optional protective cover that fits over the USB connector to inhibit any environmental contamination, over time, that may occur with the electronic components of flash memory device 11.

Figure 2:
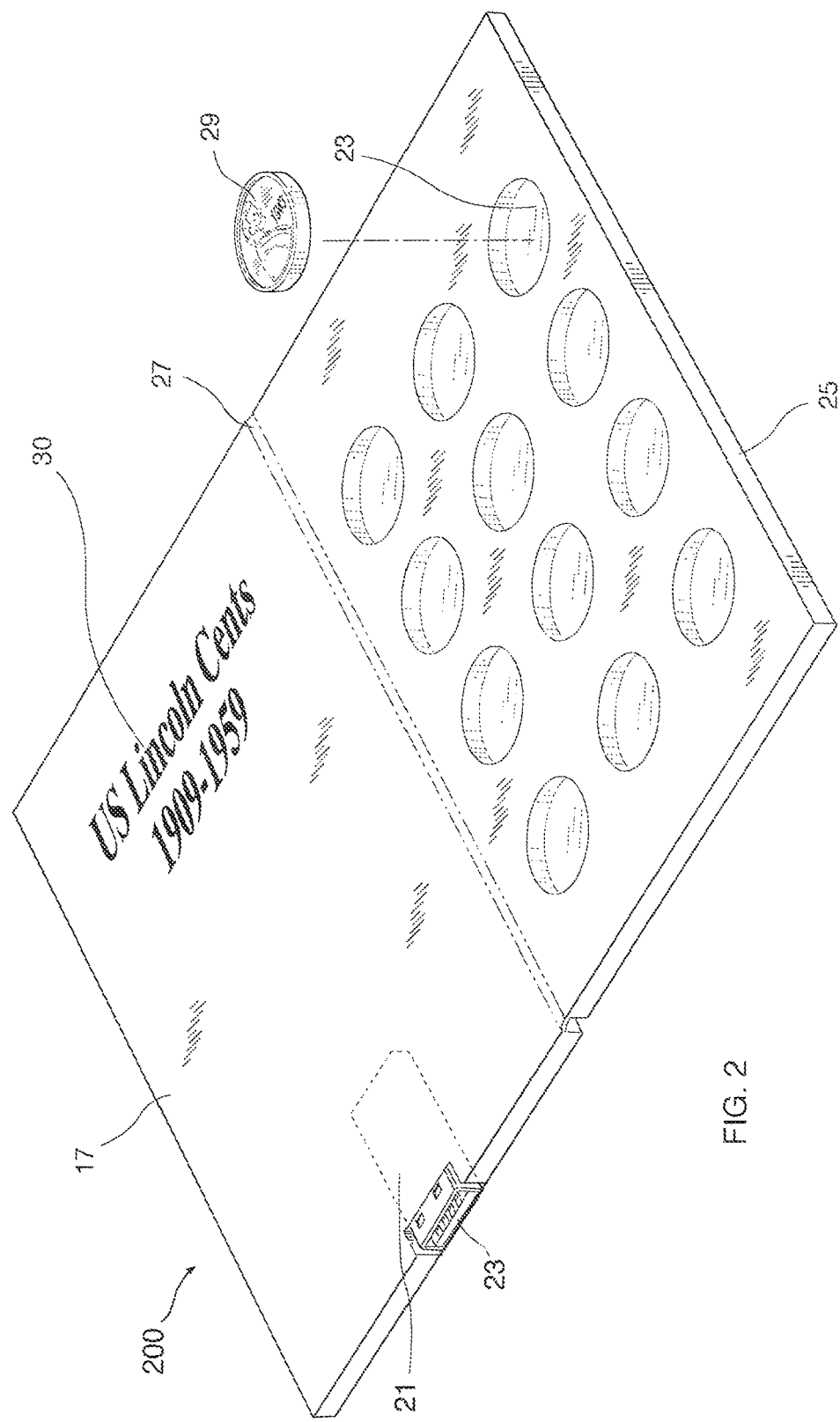
FIG. 2 shows a left front perspective view of another embodiment of an exemplary device that is useful for understanding the present invention.

FIG. 2 shows a left front perspective view of another embodiment of an exemplary device, a collectable display device 200, and is useful for understanding the present invention. Collectable display device 200 comprises at least one display panel 25 having at least one user accessible opening 23 configured for housing and displaying at least one collectable object 29. Collectable display panel device 200 is further configured connected to at least one auxiliary panel 17, as shown for example, by means of a living hinge method 27.

Display panel 25 includes visual markings 30, and shown as "US Lincoln Cents 1909-1959." Visual markings 30 are related to collectable object 29, shown as coin 29, such as a United States (US) Lincoln cent showing an appearance characteristic of a bust of Abraham Lincoln. Within the scope of the present invention, exemplary collectable display device 200 illustrates another embodiment of the present invention that is configured to store multiple collectables objects, related collectable objects, or a series of collectable objects. As such, auxiliary panel 17 may be connected to multiple display panels. For example, auxiliary panel 17 may include for example, additional display panels connected to any edge or surface of display panel 25, or auxiliary panel 17. In one such example, the right facing edge of display panel 25 may include another connected display panel, and in combination, the exemplary collectable display device would be a tri-fold structure instead of a bi-fold structure as shown.

It is an important objective of the present exemplary invention device, a collectable display panel, that even a novice collector on a budget can pursue and enjoy the rich history of collecting such examples of collectables as coins, stamps, or baseball cards. FIG. 2 merely illustrates an example of an inexpensive basal embodiment of the present invention that a collector, a novice, or even a child could be enticed, for example, to embark on a collection of only twelve Lincoln cents between the dates of 1909 and 1959. Such a collectable task of "pennies" is very doable from the pocket change studied by date in everyday monetary transactions. In this light, the present invention device is both educational and enlightening. Since the year 1909 is the first year of the minting of the Lincoln cent, and the 100 year anniversary of his birth in 1809, associated digital picture images may include for example, any picture images relating to the history of Abraham Lincoln (the 16° United State President), or any event associated with Abraham Lincoln, or with the date 1809, 1909, or picture images of a 1909 Lincoln cent, or any Lincoln cent in the series, or any digital picture image associated in any way, or in part, with any appearance characteristic of collectable object 29. In another example related to FIG. 2, but not shown, a more dedicated collector might attempt to complete a collection that includes all fifty dates, one from each year between 1909 and 1959. As such, the collectable display device 200 would include additional user accessible openings 23, and display panels 25 to configure that particular collectable display device accordingly.

Electronic solid-state flash memory data storage device 21 is non detachably secured to auxiliary panel 17, and configured having sufficient storage capacity to record and store at least one digital picture image associated with at least one appearance characteristic related to collectable object 29. At least one digital picture image is readable and displayable by an electronic device connectable to flash memory data storage device 21, for example, by means of electronic attachment to the USB connector 23 that is joined to the structure of flash memory storage device 21. Flash memory storage device 21 is accessed for connection to a standard computerized device utilizing the connection of a common USB cable connected to USB connector 23. Such computerized devices may include standard computers, laptop computers, smaller tablet type computers, even cell phones if equipped with the ability to read the solid-state flash memory data storage device.

Solid-state flash memory data storage device 21 is a type of solid-state data storage device possessing non-volatile memory, (NVM) or non-volatile data, storage that is computer memory that can retain stored information even when not powered. It includes a solid-state flash memory chip that maintains stored images and data without any external power source. It is referred to as solid state because the integrated circuit, or electronic gates in the circuit, are fixed and do not move during electronic operation. Flash memory data storage device 21 may me be any form of a flash memory data storage device, and may be for example, a USB flash drive, compact flash device, memory stick, multimedia card, secure digital card, SSD flash device, or any other type or form of a solid-state flash memory data storage device.

In some embodiments of the present invention, flash memory data storage component 21 may be configured with more than one integrated circuit (IC) partition within the flash memory chip. For example, one electronic partition, such as the partition that stores the digital picture images related to the Roman empire related to the aforementioned Denarius coin in FIG. 1, could be made read only, or immutable, and another partition may be writable for a collector to add personal notes. As such, within the context and scope of the present invention, flash memory data storage device 21 may be configured or enabled, with a read-only condition, in part or whole, to protect some or all data and/or imagery recorded on flash memory device 21.

Flash memory data storage device 21 may also include one or more security protocols that may further create an immutable condition, such as read-write protection, or a user login and password that may be configured by the collector after the purchase of the device. A user password may alternately be configured during the data write cycle and supplied to the collector (buyer) of the device.

In some embodiments, flash memory data storage device 21 may further include at least one electronic Internet link, such as a hyperlink, that can fetch at least one predetermined external database that maintains data corresponding with at least one collectable object stored on the exemplary display device. The electronic link may be made read-only also, or immutable to resist change or alteration. One or more electronic links may also be encrypted with a security feature, for example, the use of a public and private key encryption relationship between flash memory data storage device 21 and one or more electronic Internet links.

Figure 3:
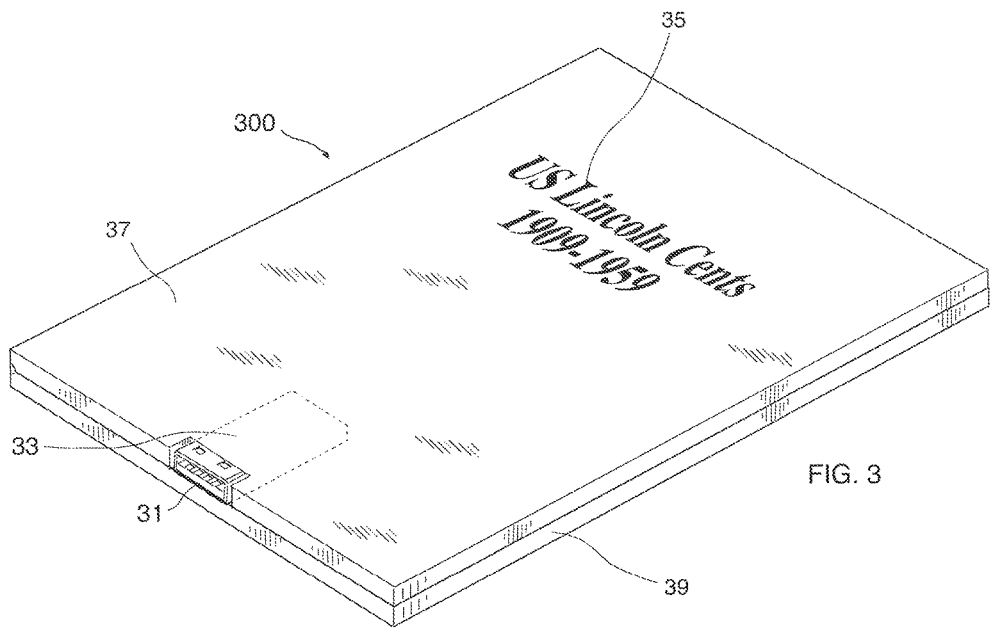
FIG. 3 shows a left front perspective view of an embodiment similar to that shown in FIG. 2 in a closed position of an exemplary device that is useful for understanding the present invention.

FIG. 3 shows a left front perspective view of an embodiment similar to that shown in FIG. 2 in a closed position that is useful for understanding the present invention. Collectable display device 300 illustrates the present invention for a collectable display device 300 that shows auxiliary panel 37 as a front cover in a closed bi-fold configuration similar to that shown as a front perspective open view as show in FIG. 2. Similarly, flash memory device 33 is shown non-detachably secured to auxiliary panel 37 and having on the outside face visual markings 35 relating to a collectable object (not shown), opposed to the inside placement of markings of auxiliary panel 17 shown in FIG. 2. Within the scope of the present invention, flash memory device 33 may be non-detachably secured to or on any surface, place, or portion of auxiliary panel 37. In this view, auxiliary panel 37 obscures the view (and as such not shown) of user accessible openings in display panel 39.

Figure 4:
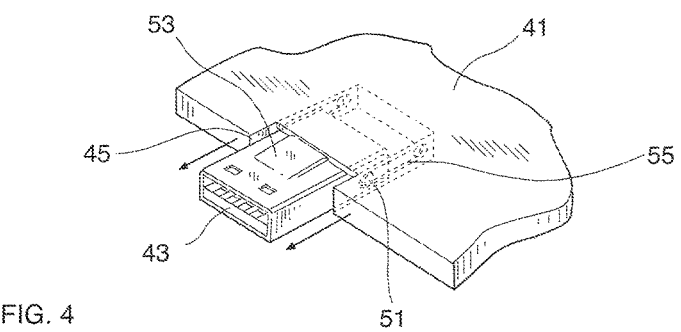
FIG. 4 shows a left front perspective detail view similar to that shown in FIG. 3 of an exemplary device that is useful for understanding the present invention.

FIG. 4 shows a perspective view detail alternative embodiment of the flash memory data storage device being relevant to FIGS. 1, 2, 3, 4, 5 and 6. Flash memory device 43 is non-detachably secured to auxiliary panel 41 (shown as a portion). Flash memory data storage device 43 is shown having a movable condition that provides for concealment in one position, and electronic attachment accessibility in a second position. Flash memory data storage device 43 may include, for example, a flexible tab 53 that may be formed from metal or plastic that provides a positional locking feature for electronic attachment accessibility in the open position (shown). Tab 53 flexes upward when manually pulled forward from the closed position, and creates a structural interference with the top edge surface of holder slot 45 in the open position. A structurally formed "ball and indent rail system" 55, wherein a ball protrusion 51 is formed on the sides of flash memory data storage device 43 provides for a non-detachable condition from the auxiliary panel 41 by restriction within slide rails 55 formed into slot opening 45 of auxiliary panel 41. In the open position (shown), tab 53 is manually pressed down below the threshold of the top edge surface of slot opening 45, and flash memory data storage device 43 is then pressed into auxiliary panel 41 for concealment.

Figure 5:
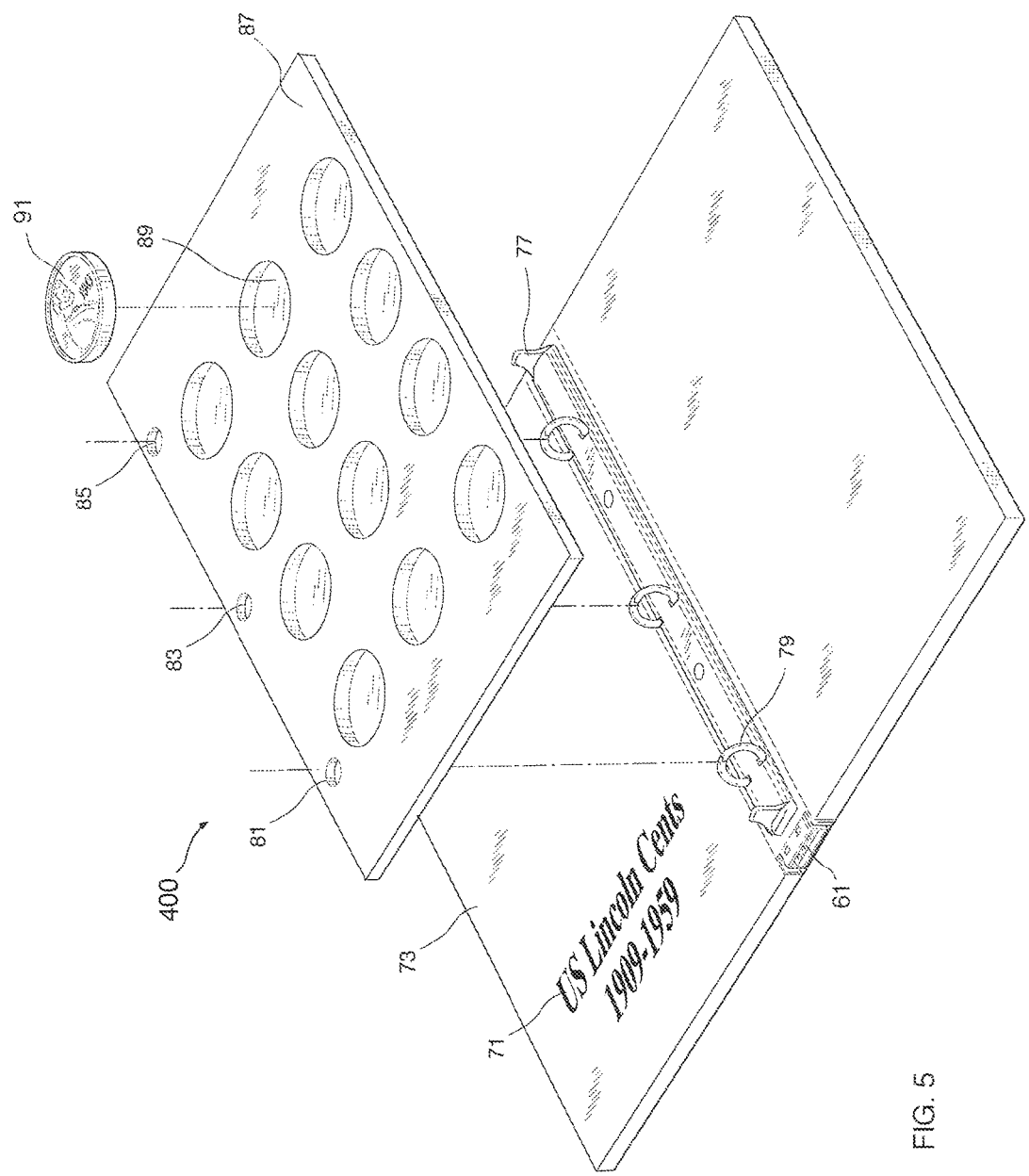
FIG. 5 shows a left front perspective view disassembled of an exemplary device that is useful for understanding the present invention.

FIG. 5 shows a left front perspective view disassembled of an exemplary device that is useful for understanding the present invention. Collectable display device 400 is comprised of at least one display panel 87 having at least one user accessible opening 89 for housing and displaying at least one collectable object 91, and further configured connectable to at least one auxiliary panel 73 comprised of visual markings 71 relating to at least one collectable object 91. Display panel 87 is configured to be connectable to auxiliary panel 87 by means of panel holes 81, 83, and 85, that align with a three-ring binder type mechanism 77 that is shown attached to auxiliary panel 73. Within the scope of the present invention, auxiliary panel 73, and display panel 87 may be connectable by any means that "connects" them together, thus providing structural attachment of one or more display panels. In this example, binder mechanism 77, may be similar to a three-ring binder mechanism, and the three circular metal rods are formed by two pieces, that open to accept one or more display panels, and close to connect display panel 87 through holes 81,83, and 85 to auxiliary panel 73.

Display panel 87, may be connectable and detachable to auxiliary panel 73 by various means and structures, for example but not limited to, pins, screws, bolts, hooks, etc. The exemplary collectable display device 400 provides for the addition of multiple display panels that may be added, removed, or replaced as a collector builds a collection over time, and often times a series of coins. In an example. Morgan silver dollars may include an entire series of dates and mintmarks that include, for example almost a hundred different coins in the set. In this example, multiple display panels would be required to display and house an entire set.

Display panel 87 may further include additional preservation methods for the collectibles housed and displayed on display panel 87. One such method, might include a clear plastic sheet, such as Mylar, that is attachable and removable from display panel 87 or user accessible openings 89 as a slipcase or panel that is attached and removable to display panel 87.

Auxiliary panel 73 includes visual markings 71 that are related to coin 91, such as a Lincoln cent having a bust of Abraham Lincoln. Visual markings 71 shown as "US Lincoln Cents 1909-1959" may be on any surface of display panel 73, and may be on more than one surface for instance, the opposite side (not shown) of display panel 73 may include the same visual markings 71 or different visual markings. Visual markings 71 may be related in any way to collectable object 91, by date, series, denomination, persons, landmarks, objects, history, as just a few examples. Visual markings 71 may be printed, stamped on, or affixed in any method, and may be for example, a label, a silkscreen, a pad print, a stencil, etching, embossing, or stamping.

In FIG. 5, auxiliary panel 73 is shown as a tri-fold configured panel that forms a front cover and a rear cover that further provides protection of display panel 87. However, in some embodiments auxiliary panel 73 may be for example, only a front cover, or only a rear cover that is connectable and detachable from one or more display panels.

The collectable display device 400 further comprises an electronic solid-state flash memory data storage device 61 that is non-detachably secured, thus resists detachment, to auxiliary panel 73, and solid-state flash memory device 61 is configured to have sufficient storage capacity to record and store at least one digital picture image associated with at least one appearance characteristic of said at least one collectable object, as shown as Lincoln cent 91. For example, flash memory device 61 may include historical information and digital picture images related to coin 91, such as information and digital picture images of historical objects or persons related to coin 91. Digital picture images include, for example, related picture images of coin 91, such as the collectable object itself, the design elements, the designer or engraver, the person/s or objects on the coin itself, picture images of the minting process, related landmarks, mint facilities, artifacts, or documents related to coin 31. Digital picture images would typically further comprise data, such as text or storylines corresponding to one or more digital picture images.

Exemplary Coin 91 is shown as a Lincoln cent, as such digital picture images may include, for example, a detailed picture image of a photograph of Abraham Lincoln, a digital picture image of his childhood log cabin, a digital picture image of the "Gettysburg Address," and a digital picture image of "Ford's Theatre" where Lincoln was assassinated. The digital picture images would typically include additional data, text and storylines associated with the digital picture imagery, and would typically comprise data of more than one predetermined characteristic of the collectable object. One or more digital images stored on flash memory device 61 may be read-only, and immutable, such as a read-only-memory (ROM), that is electronically configured in whole or in part. In addition flash memory device 61 may include additional security features such as a user password, and may be electronically partitioned, for example, with a read-write partition and a read-only partition.

Solid-state flash memory data storage device 61 may further comprise (as shown) a universal serial bus (USB) connector. In operation, flash memory device 61 is readable by an electronic device physically and electronically connected to flash memory device 61. An inexpensive USB cable for example may be used for example, and attached to any electronic device that includes a display device, such as a PC, a laptop computer, electronic tablet, cellular phone device, or any other electronic device that is physically and electronically connectable to flash memory device 61. Flash memory data storage device 61 may also be as shown in FIG. 4, and may have a movable condition that provides for concealment in one position, and electronic attachment accessibility in a second position. The movable condition may also include any form or structure, and in another example, may be movable and concealable by means of a retractable electronic cord connected to flash memory device 61 and auxiliary panel 73.

Electronic solid-state flash memory data storage device 61 may have further stored thereon at least one electronic link that can fetch at least one predetermined external database that maintains data associated with at least one collectable. The electronic link may be in the form of a URL, a hotlink, a hyperlink or any electronically coded link that fetches an external database. Electronic links may include associated data with coin 19, for example, current valuations, certified populations, coin registry, supplies, sales, auctions, or any data associated with any collectable in any way. One or more electronic links may be electronically configured as read-only, thereby being immutable and resistant to change or alteration that may occur, for example, by accidental deletion.

Figure 6:
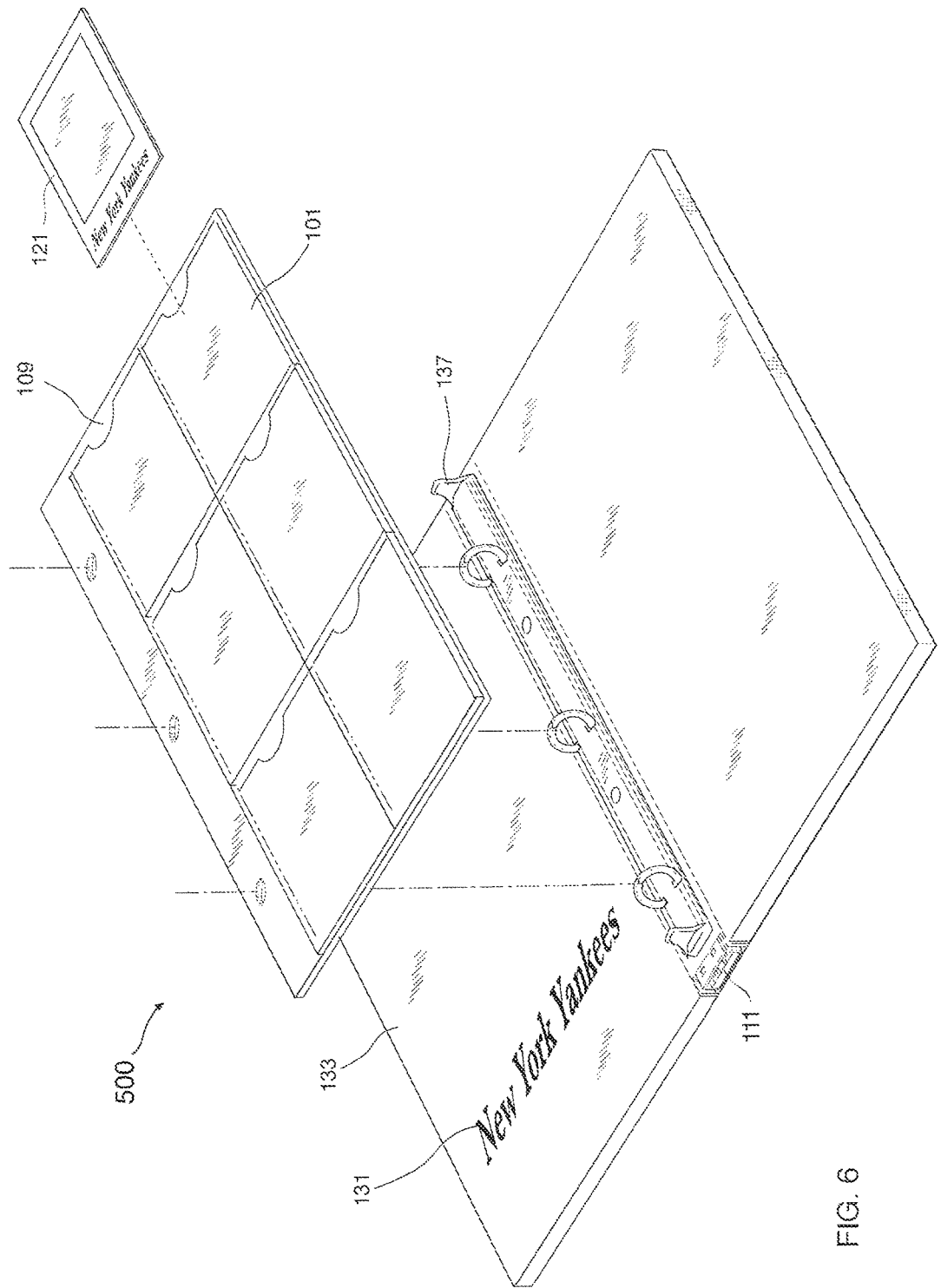
FIG. 6 shows a left front perspective view disassembled of another embodiment of an exemplary device that is useful for understanding the present invention.

FIG. 6 shows a left front perspective view disassembled of another embodiment of an exemplary device that is useful for understanding the present invention. FIG. 6 illustrates an exemplary embodiment of the present invention for a collectable display device 500, configured for housing and displaying sports card collectables. Sports cards are well known collectable objects, often made from cardboard and depicting printed images and information related to sports athletes. As just one example, Topps Inc., is a major manufacturer and distributor of sports cards, such as baseball cards, football cards, hockey cards, and basketball cards.

Display panel 109 is shown having at least one user accessible opening shown as sleeve pocket 101 for housing and displaying at least one collectable object and shown as sports card 121. Display panel 109 may be a clear plastic, for example made of Mylar, and sports card 121 is simply inserted into display panel sleeve pocket 101. Display panel 109 may have any number of collectable openings practical to the size and ergonomics of the display panel considering the size of the collectable object.

Display panel 109 is further configured to be connectable to at least one auxiliary panel 133 having visual markings 131 relating to at least one collectable, shown as sports card 121. Display panel 109 is connectable to binder structure and mechanism 137 by means of punched holes in display panel 109. An electronic solid-state flash memory data storage device 111 is non-detachably secured to auxiliary panel 133, and flash memory device 111 is configured to have sufficient storage capacity to record and store at least one digital picture image associated with at least one appearance characteristic of collectable object 121. Wherein, in operation, the solid-state flash memory device 111 is readable by an electronic device physically and electronically connected to the solid-state flash memory device.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A collectable coin display device comprising:
at least one display panel having at least one user accessible opening configured as a preformed cavity to compactly store at least one collectable coin, and connected to at least one auxiliary panel having visual markings relating to said at least one collectable coin; and,
an electronic solid-state flash memory data storage device non-detachably secured to said auxiliary panel, the solid-state flash memory device having sufficient storage capacity to record and store at least one digital picture image associated with at least one appearance characteristic of said at least one collectable coin, said electronic solid-state flash memory data storage device further has stored thereon at least one electronic link that can fetch at least one predetermined external database that maintains data associated with said at least one collectable, said electronic link stored on said electronic solid-state flash memory data storage device as read-only, said flash memory data storage device comprising a universal serial bus (USB) connector;

wherein, in operation, said solid-state flash memory device is readable by an electronic device physically and electronically connected to said solid-state flash memory device.

2. The collectable coin display device according to claim 1, wherein two or more display panels are connectable.

3. The collectable coin display device of claim 1, wherein an auxiliary panel is connectable to said at least one display panel, and said auxiliary panel includes visual markings related to said collectable coin.

4. The collectable coin display device of claim 1, wherein said at least one digital picture image further comprises data corresponding to said at least one digital picture.

5. The collectable coin display device of claim 1, wherein said auxiliary panel forms a front cover, a rear cover, or both that is connected to said at least one display panel.

6. The collectable coin display device of claim 3, wherein said flash memory data storage device is movable, such that movement provides for concealment in one position and electronic attachment accessibility in a second position.

7. A collectable coin display device comprising:

at least one display panel having at least one user accessible opening configured as a preformed cavity to compactly store at least one collectable coin, and further configured to be connectable to at least one auxiliary panel having visual markings relating to said at least one collectable coin; and, an electronic solid-state flash memory data storage device non-detachably secured to said auxiliary panel, the solid-state flash memory device having sufficient storage capacity to record and store at least one digital picture image associated with at least one appearance characteristic of said at least one collectable coin, said at least one digital picture image stored on said solid-state flash memory device is stored as read-only, said flash memory data storage device comprising a universal serial bus (USB) connector; and, wherein, in operation, said solid-state flash memory device is readable by an electronic device physically and electronically connected to said solid-state flash memory device.

8. The collectable coin display device of claim 7, wherein said at least one digital picture image further comprises data corresponding to said at least one digital picture.

9. The collectable coin display device of claim 7, wherein said auxiliary panel forms a front cover, a rear cover, or both that is connectable to said at least one display panel.

10. The collectable coin display device of claim 7, wherein said flash memory data storage device is movable, such that movement provides for concealment in one position and electronic attachment accessibility in a second position.

11. The collectable coin display device of claim 7, wherein said electronic solid-state flash memory data storage device further has stored thereon at least one electronic link that can fetch at least one predetermined external database that maintains data associated with said at least one collectable.

12. The collectable coin display device of claim 11, wherein said electronic link stored on said electronic solid-state flash memory data storage device as read-only.

* * * * *